(12) United States Patent
Yamamoto et al.

(10) Patent No.: US 11,273,479 B2
(45) Date of Patent: Mar. 15, 2022

(54) EXTRUSION PRESS SHEARING DEVICE

(71) Applicant: Ube Machinery Corporation, Ltd., Ube (JP)

(72) Inventors: Takeharu Yamamoto, Ube (JP); Kouji Nakano, Ube (JP)

(73) Assignee: Ube Machinery Corporation, Ltd., Ube (JP)

( * ) Notice: Subject to any disclaimer, the term of this patent is extended or adjusted under 35 U.S.C. 154(b) by 147 days.

(21) Appl. No.: 16/635,620

(22) PCT Filed: Aug. 8, 2018

(86) PCT No.: PCT/JP2018/029829
§ 371 (c)(1),
(2) Date: Jan. 31, 2020

(87) PCT Pub. No.: WO2019/031562
PCT Pub. Date: Feb. 14, 2019

(65) Prior Publication Data
US 2020/0238354 A1    Jul. 30, 2020

(30) Foreign Application Priority Data

Aug. 8, 2017   (JP) ............................. JP2017-153090

(51) Int. Cl.
| | |
|---|---|
| *B21C 35/04* | (2006.01) |
| *B21C 23/21* | (2006.01) |
| *B21C 25/02* | (2006.01) |
| *B23D 15/04* | (2006.01) |
| *B23D 15/14* | (2006.01) |

(52) U.S. Cl.
CPC ............ *B21C 35/04* (2013.01); *B21C 23/218* (2013.01); *B21C 23/212* (2013.01); *B21C 25/02* (2013.01); *B23D 15/04* (2013.01); *B23D 15/14* (2013.01)

(58) Field of Classification Search
CPC ....... B21C 35/04; B21C 15/04; B21C 23/212; B21C 23/218; B21C 25/02; B21C 35/00
USPC .................................................... 72/254, 255
See application file for complete search history.

(56) References Cited

U.S. PATENT DOCUMENTS

| | | | | |
|---|---|---|---|---|
| 2013/0118221 | A1* | 5/2013 | Furuse | .................... B21C 23/00 72/273 |
| 2013/0152661 | A1* | 6/2013 | Imaeda | ................. B30B 15/026 72/389.3 |
| 2018/0001365 | A1 | 1/2018 | Yamamoto et al. | |

FOREIGN PATENT DOCUMENTS

| | | | |
|---|---|---|---|
| CN | 103079722 A | 5/2013 | |
| JP | 05-138235 A | 6/1993 | |
| JP | 07-195117 A | 8/1995 | |
| JP | 2013039585 A * | 2/2013 | ............ B21C 35/04 |
| WO | 2016/117146 A1 | 7/2016 | |

(Continued)

*Primary Examiner* — Jessica Cahill
*Assistant Examiner* — Jared O Brown
(74) *Attorney, Agent, or Firm* — DLA Piper LLP (US)

(57) ABSTRACT

An extrusion press shearing device includes: a converter that converts rotational motion of a ball screw into linear motion of a shearing slide drive frame; a shearing slide attached to the leading end of the shearing slide drive frame; and hydraulic cylinders attached to the shearing slide drive frame, wherein the ball screw of the converter and the hydraulic cylinders are arranged in parallel, and the ball screw is rotated to move the shearing slide vertically so that a discard is cut off by the hydraulic cylinders.

4 Claims, 2 Drawing Sheets

(56) References Cited

FOREIGN PATENT DOCUMENTS

WO     WO-2016117146 A1 * 7/2016 ............. B21C 35/04

* cited by examiner

PRIOR ART

EXTRUSION PRESS SHEARING DEVICE

FIELD

The present invention relates to a shearing device in an extrusion press for extruding an aluminum alloy or other metal, which makes a container move away from a die after extrusion, wherein the shearing device cuts off a remainder of a billet, that is, a discard, at a front surface of the die to thereby cut it off from an extruded product part.

BACKGROUND

In a conventional shearing device of an extrusion press, a hydraulically driven shearing cylinder for cutting off the discard is attached facing downward to a frame provided at a container side of a top part of an end platen holding the die. A shearing blade is provided at the bottom end part of a piston rod of the shearing cylinder through a shearing slide.

In a conventional shearing device such as shown in PTL 1, the hydraulically driven shearing cylinder, frame, shearing slide, and shearing blade are connected in series. When making the container approach the die, the shearing blade of the bottom end of the shearing device has to be made to retract above so as not to interfere with the container.

CITATION LIST

Patent Literature

[PTL 1] Japanese Unexamined Patent Publication No. 5-138235

SUMMARY

Technical Problem

In a conventional shearing device of an extrusion press such as shown in PTL 1, there are the following problems.

To keep the shearing blade of the bottom end of the shearing device from interfering with the container holder at the limit of ascent of the shearing device, at the position of the limit of ascent of the hydraulically driven shearing cylinder, it is necessary that the shearing blade at the bottom end of the shearing device be at a position higher than the upper surface of the container (below, the "standby position").

When cutting off the discard, while low in speed, a large force (low speed, high output) is necessary and the shearing blade is acted on by force in various directions act due to the cutting resistance (cutting resistance force). To accurately cut off the discard against such a cutting resistance force, during the shearing blade operation at the cutting position of the discard (hereinafter referred to as the "cutting position") (cutting off discard by driving shearing blade), it is necessary that the shearing blade be firmly guided so as not to move in a direction other than downward.

However, the shearing blade is at the standby position except when performing the shearing blade operation. It is not possible to place a member for guiding the shearing blade below the standby position. Therefore, to firmly guide the shearing blade even in the state making the shearing blade descend from the standby position to the cutting position, that is, at the time of the shearing blade operation, an arrangement is employed in which the shearing blade is attached to the bottom end of a shearing slide having a total length substantially the same as the distance from the standby position to the cutting position, the shearing slide is guided to the shearing guide, and the shearing slide is driven by the shearing cylinder. While only natural, the shearing guide guiding the shearing slide also has to be made a total length substantially equal to the distance from the standby position to the cutting position.

For this reason, to secure the ascending/descending stroke of the shearing blade at the bottom end of the shearing device from the standby position to the cutting position, the shearing cylinder and shearing slide (shearing guide) hydraulically driven corresponding to this ascending/descending stroke are arranged in series above the end platen, so the total height of the shearing device becomes higher and in turn the total height of the extrusion press provided with the shearing device also becomes higher. It may be necessary to raise the height of the building etc. according to this.

As previously explained, at the time of cutting off the discard, a large force (low speed, high output) is required, so in a conventional shearing device, a hydraulically driven shearing cylinder having a predetermined pressure receiving area able to cut off the discard by the supplied hydraulic fluid pressure is employed. For this reason, even at times other than when performing the shearing blade operation requiring a large force, for example, a descent operation before and after the shearing blade operation making the shearing blade at the standby position descend to right above the cutting position (right above the discard) and further an ascent operation after cutting off the discard making the shearing blade ascend from the cutting end position to the standby position (container retraction operation), supply of hydraulic fluid to the shearing cylinder is required. In driving the hydraulic pump for supply of hydraulic fluid to the extrusion press and the motor for the hydraulic pump, it is not possible to contribute to energy saving.

Solution to Problem

To achieve the above-mentioned object, according to the present invention, there is provided a shearing device of an extrusion press comprising a converting means for converting rotational motion of a ball screw to linear motion of a shearing slide driving frame, a shearing slide attached to a leading end of the shearing slide driving frame, and a hydraulic cylinder attached to the shearing slide driving frame, wherein the ball screw of the converting means and the hydraulic cylinder are arranged in parallel and the ball screw is turned to move the shearing slide up and down to cut off a discard by the hydraulic cylinder.

When a rod of the hydraulic cylinder advances and retracts along with movement of the shearing slide driving frame moving due to turning of the ball screw, the hydraulic cylinder may fluidly communicate a head side chamber and rod side chamber of the hydraulic cylinder to move hydraulic fluid between the head side chamber and the rod side chamber.

A hydraulic pump motor supplying hydraulic fluid to the hydraulic cylinder may be an inverter motor or a servo motor, and the hydraulic pump motor may be made to stop operating during the movement of the hydraulic fluid.

Advantageous Effect of Invention

Even in the case where the stroke of the shearing blade is the same as a conventional shearing device, by dividing the drive device into two parts of a first driving means and a second driving means and arranging the two drive devices in parallel, it is possible to greatly lower the height of the shearing device, so it is possible to lower the total height of the extrusion press provided with that shearing device. For this reason, it is possible to lower the height of the portion of the building at which the extrusion press is installed.

DESCRIPTION OF EMBODIMENTS

Figure 1:
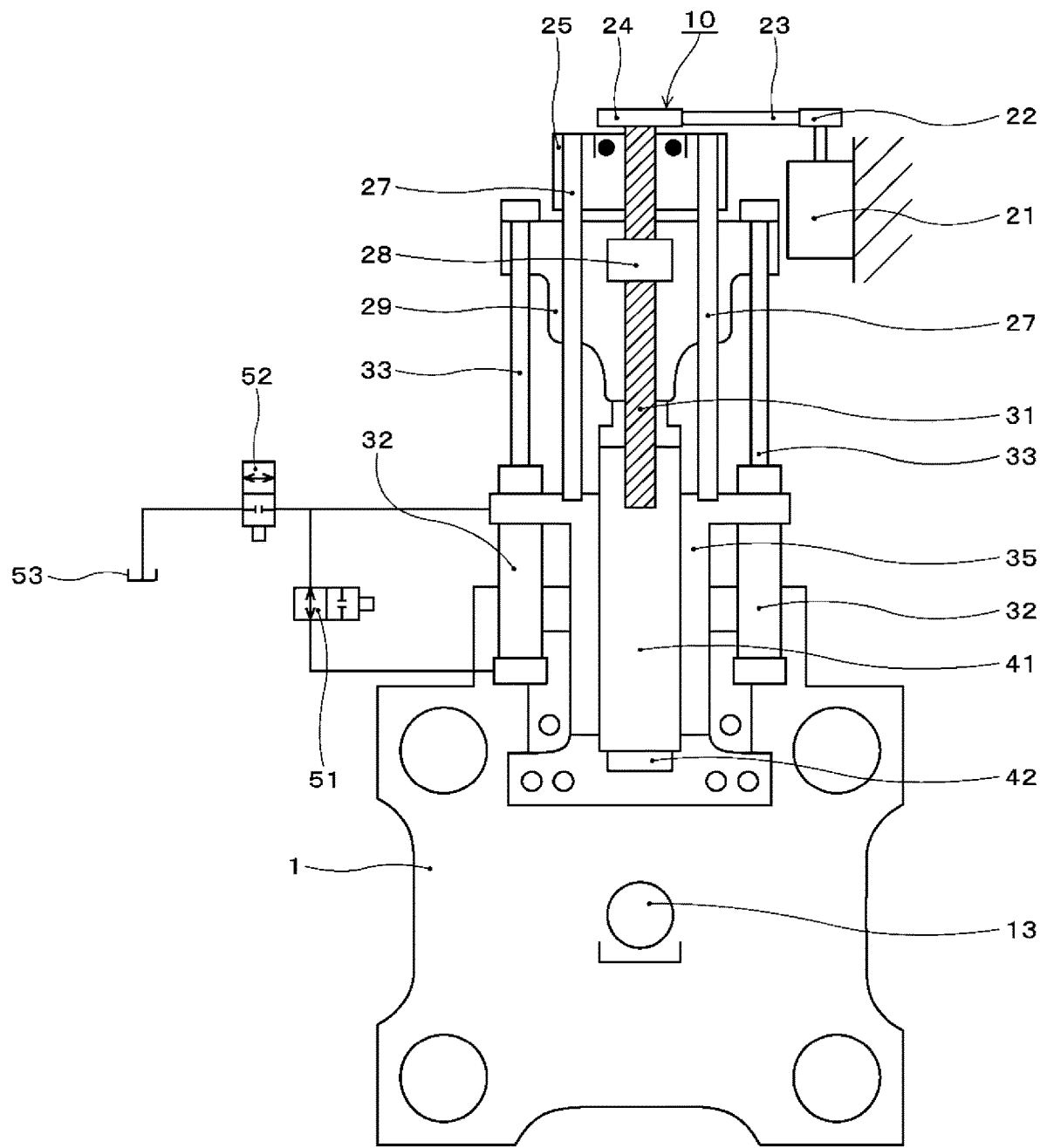
FIG. 1 is a front view of a shearing device of the present invention.

Embodiments of the shearing device of the extrusion press according to the present invention will be explained in detail below while referring to the drawings.

FIG. 1 shows a front view of a shearing device of the present invention. Reference numeral 1 shows an end platen holding a not shown die, while 13 shows a remaining part of a not shown billet sticking out from the die, that is, a discard. The shearing device 10 is fastened to a container (not shown) side of the top part of the end platen 1 through a later explained shearing guide 35.

A servo motor 21 arranged at a fastening frame 25 is used to drive a drive pulley 22, belt 23, and driven pulley 24, whereby a ball screw 31 supported at the fastening plate 25 to be able to rotate at the top is made to turn. The rotational motion of the ball screw 31 is converted to linear motion by a nut 28 (converting means/first driving means). The nut 28 is fastened to the shearing slide driving frame 29, so by turning the ball screw 31, the shearing slide driving frame 29 moves up and down (linear motion). The shearing slide driving frame 29 is guided by guides 27 in up and down movement. As shown in FIG. 1, the fastening frame 25 may be connected with the shearing guide 35 by the plurality of guides 27, but, for example, in another embodiment, not shown connecting members etc. separate from the shearing guide 35 may be used to connect the fastening frame 25 and shearing guide 35 at the back side of FIG. 1.

At the bottom of the shearing slide driving frame 29 (leading end), a shearing slide 41 is attached. At the bottom end of the shearing slide 41, a shearing blade 42 is attached. For this reason, when the shearing slide driving frame 29 moves up and down, the shearing slide 41 and the shearing blade 42 move integrally with it. On the other hand, during cutoff by the shearing blade 42, that is, at the time of a shearing blade operation, the shearing blade 42 attached to the bottom end of the shearing slide 41, as explained previously, moves from above to below the discard so as to cut off the discard by shearing. Accordingly, at the time of the shearing blade operation, the shearing blade 42 receives force not only upward in FIG. 1, but in various directions due to the cutting resistance (cutting resistance force) such as the direction making the shearing blade 42 move from the not shown die end face (front face) in the front direction of FIG. 1 or the left-right direction of FIG. 1. For this reason, the shearing slide 41 at the bottom end of which the shearing blade 42 is guided in up and down movement together with the shearing slide driving frame 29 by the shearing guide 35 fastened to the container (not shown) side of the top part of the end platen 1 separate from the guides 27 guiding the up and down movement of the shearing slide driving frame 29.

At the guides 27 guiding up and down movement of the shearing slide driving frame 29 and the converting means for moving the shearing slide driving frame 29 up and down (ball screw 31 and nut 28 and rotational support part supporting the ball screw 31 at the fastening frame 25 to be able to rotate etc.), cutting resistance force in various directions acting on the shearing blade 42 at the time of the shearing blade operation such as explained above is directly transmitted. This mode of support prevents these from breaking.

For this reason, it is more preferable to employ a configuration where the shearing slide driving frame 29 and the shearing slide 41 are connected so that only interacting force in the up and down direction is transmitted to both members of the shearing slide driving frame 29 and the shearing slide 41, for example, a configuration where separate members are provided so that the connecting part becomes off-centered and are connected through a connecting pin or connecting member so as to allow displacement of both configurations due to forces other than the interacting force in the up and down direction.

At the shearing guide 35, two hydraulic cylinders 32 (second driving means) are attached at their respective hydraulic cylinder bodies. The rods 33 of the hydraulic cylinders 32 are fastened to the shearing slide driving frame 29.

In the present embodiment, the two hydraulic cylinders 32 are arranged in this way in parallel with the ball screw 31, so the hydraulic cylinders 32 and the shearing slide 41 (shearing guide 35) are not arranged in series above the end platen, that is, at least parts of the total lengths of these components are superposed for arrangement in parallel, it becomes possible to lower the total height of the shearing device.

The two hydraulic cylinders 32 are supplied with hydraulic fluid from a not shown hydraulic pump to the rod side chambers of the hydraulic cylinders 32 only at the time of operation of the shearing blade to cut off the discard. That is, the discard is cut off based on the force generated by the hydraulic cylinders 32.

In the present embodiment, a mode is shown in which the hydraulic cylinder bodies of the hydraulic cylinders 32 are fastened to the shearing guide 35 while the rods 33 are fastened to the shearing slide driving frame 29, but conversely to this mode, it is also possible to fasten the rods 33 of the hydraulic cylinders 32 to the shearing guide 35 and the hydraulic cylinder bodies to the shearing slide driving frame 29. By fastening the rods 33 of the hydraulic cylinders 32 above the standby position of the shearing blade 42 and below the shearing guide 35, it is possible to make the major parts of the total lengths of the hydraulic cylinders 32 and the shearing slide 41 (shearing guide 35) overlap in the height direction. According to this mode, it is possible to supply hydraulic fluid to the rod side chambers of the hydraulic cylinders 32 to cut off the discard.

The two hydraulic cylinders 32 are connected at the ports of their respective head side chambers and rod side chambers through a switching valve 51. If the switching valve 51 is opened, the head side chambers and the rod side chambers communicate with each other and hydraulic fluid moves between these two hydraulic chambers.

Normally, the shearing blade 42 of the shearing device 10 stands by at the standby position shown in FIG. 1. This standby position, as explained before, is a position where interference between the shearing blade 42 and the container holder can be avoided.

The shearing operation of the shearing device 10 of the extrusion press according to the present invention will be explained. First, the servo motor 21 is made to turn the ball screw 31 to make the shearing blade 42 move from the standby position to right above the discard 13 (right above cutting position) (descent/shearing blade electrically powered drive).

At the time of descent of the shearing blade 42 by the servo motor 21, it is not necessary to supply hydraulic fluid from the hydraulic pumps (not shown) for supply of hydraulic fluid to the extrusion press to the two hydraulic cylinders 32. Further, at this time, along with the descent of the shearing slide driving frame 29, the rods 33 of the hydraulic cylinders 32 fastened to the shearing slide driving frame 29 are pushed into the hydraulic cylinder bodies of the hydraulic cylinders 32. For this reason, to prevent the hydraulic cylinders 32 from acting as resistance at the time of descent of the shearing slide driving frame 29, it is preferable to move the hydraulic fluid at the head side chambers of the hydraulic cylinders 32 to the rod side chambers of the hydraulic cylinders 32 by opening the switching valve 51.

Note that, in the amount of hydraulic fluid moved from the head side chambers to the rod side chambers, the amount of hydraulic fluid discharged from the head side chambers is greater than the hydraulic fluid to be supplied to the rod side chambers. To prevent the hydraulic cylinders 32 from acting as resistance at the time of descent of the shearing slide driving frame 29, when hydraulic fluid moves from the head side chambers to the rod side chambers, it is more preferable to open a switching valve 52 to suitably discharge the excess hydraulic fluid to an oil tank 53.

If the shearing blade 42 descends to right above the discard 13 (right above the cutting position), the rod side chambers of the two hydraulic cylinders 32 are supplied with hydraulic fluid from hydraulic pumps (not shown) and the rods 33 of the hydraulic cylinders 32 are used to make the shearing slide driving frame 29 descend, so that the shearing blade 42 attached to the bottom end of the shearing slide 41 cuts off the discard 13 (shearing blade operation).

At the time of the shearing blade operation, the hydraulic fluid discharged from the head side chambers of the hydraulic cylinders 32 is discharged by a not shown hydraulic pipeline to the oil tank 53.

At the time of descent of the shearing slide driving frame 29, the ball screw 31 is turned by the nut 28 fastened to the shearing slide driving frame 29. This rotational torque is transmitted to the servo motor 21. To prevent the servo motor 21 from acting as resistance at the time of descent of the shearing slide driving frame 29 or to prevent unenvisioned load from acting on the servo motor 21 and converting means (the ball screw 31 or nut 28 and a rotational support part etc. supporting the ball screw 31 at the fastening frame 25 to be able to rotate etc.) etc., the servo motor 21 may be set to a torque free state or may be controlled in rotation so as to track the rotational speed of the ball screw 31 accompanied with descent of the shearing slide driving frame 29.

It is preferable that the shearing blade 42 moves from the standby position of the shearing device 10 to right above the discard 13 (right above the cutting position) at a high speed from the viewpoint of shortening the extrusion cycle (high speed, low output). If like in the present embodiment, in an embodiment in which a servo motor 21 is used to turn the ball screw 31 or an embodiment in which, instead of a servo motor 21, an inverter or other electric motor able to be controlled in speed is employed, in control of the operation for movement of the shearing blade 42 downward to right above the cutting position, the ball screw 31 is made to rotate as long and as fast as possible down to a position closer to the cutting position and, considering the deceleration region, the shearing blade 42 is made to stop accurately right above the cutting position.

After the discard 13 is cut off (cutting end position), the shearing blade 42 moves upward to the standby position (ascent/shearing blade electrically powered driving).

At the time of ascent of the shearing blade 42 by this servo motor 21 as well, in the same way as when the shearing blade 42 descends, it is not necessary to supply hydraulic fluid from the hydraulic pumps to the two hydraulic cylinders 32. Only the servo motor 21 is driven to make the shearing blade 42 ascend from the cutting end position to the standby position.

At this time, along with the ascent of the shearing slide driving frame 29, the rods 33 of the hydraulic cylinders 32 fastened to the shearing slide driving frame 29 are pulled out from the hydraulic cylinder bodies of the hydraulic cylinders 32. For this reason, to prevent the hydraulic cylinders 32 from acting as resistance at the time of ascent of the shearing slide driving frame 29, conversely to the time of descent of the shearing slide driving frame 29, it is preferable that the hydraulic fluid of the rod side chambers of the hydraulic cylinders 32 is moved to the head side chambers of the hydraulic cylinders 32 by opening the switching valve 51.

At this time, the hydraulic fluid moved from the rod side chambers to the head side chambers of the hydraulic cylinders 32 can be not enough, so it is preferable to set the switching valve 52 to the open state to suck out the insufficient hydraulic fluid from the oil tank 53.

Figure 2:
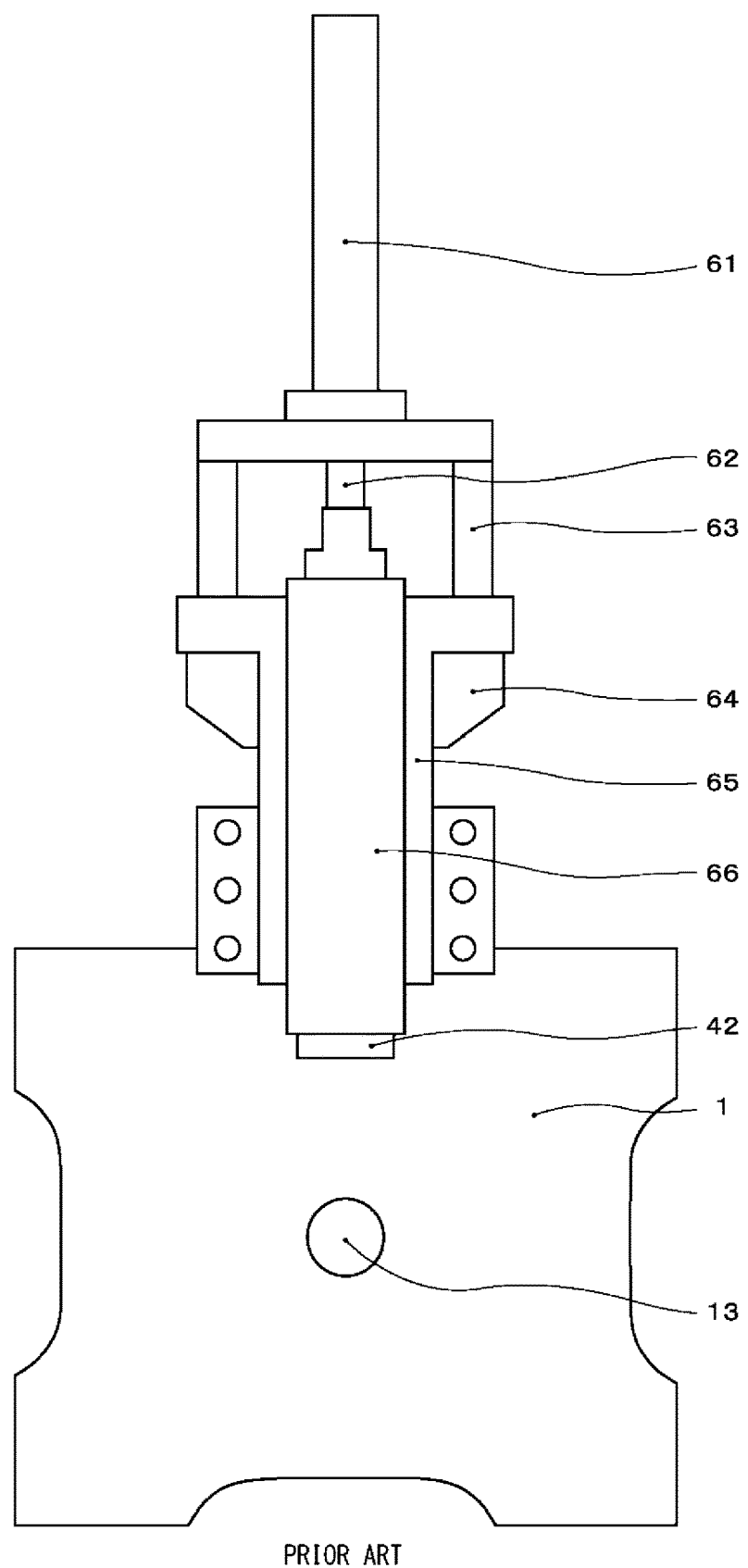
FIG. 2 is a front view of a conventional shearing device.

FIG. 2 shows a front view of a conventional shearing device. The main difference from the shearing device of the present invention shown in FIG. 1 is that a shearing frame 64 provided with a shearing guide 65 is fastened to a container side of a top part of an end platen 1 and two connecting rods 63 projecting out from the shearing frame 64 are used to fasten a projecting side end of a rod 62 of a single hydraulic cylinder 61 to a base part connected to the shearing frame 64.

The conventional shearing device has the single hydraulic cylinder 61 corresponding to this ascending/descending stroke and a shearing slide 66 (shearing guide 65) arranged in a line above the end platen 1 so as to secure the ascending/descending stroke of the shearing blade 42 at the bottom end of the shearing device at the cutting end position of a discard 13 from the standing position, so the total height of the shearing device becomes higher. Therefore, the total height of the extrusion press itself becomes higher and as a result it can be necessary to raise the height of the ceiling of the building in which the extrusion press is installed etc.

The present invention had the following advantageous effect. By dividing the drive device into the two parts of an electrically powered first driving means and a hydraulically powered second driving means and arranging the two drive devices in parallel, it is possible to greatly lower the height of the shearing device even in the case of the same stroke of the shearing blade as with a conventional shearing device and in turn possible to lower the total height of the extrusion press provided with the shearing device. For this reason, it is possible to lower the height of the portion of the building where the extrusion press is installed.

Further, during the descent of the shearing blade from the standby position to the cutting position and during the ascent of the shearing blade from the cutting end position to the standby position before and after the shearing blade operation, that is, at the time of electrically powered driving of the shearing blade, it is possible to completely stop the supply of hydraulic fluid from the hydraulic pumps to the shearing device. For this reason, compared with a conventional shearing device which required supply of hydraulic fluid for the entire process of driving the shearing blade, the required amount of hydraulic fluid supplied to the shearing device for up and down movement between the standby position and the cutting position (cutting end position) of the shearing blade including before and after the shearing blade operation can be greatly reduced and it is possible to contribute to energy saving in driving the hydraulic pumps for supply of hydraulic fluid to the extrusion press and the motors for the hydraulic pumps.

Further, by using inverter motors or servo motors for the motors for driving these hydraulic pumps, it becomes possible to control the speeds of the plurality of hydraulic pumps or control some selected hydraulic pumps to stop in accordance with the reduction in the required amount of hydraulic fluid when driving the shearing blade under power or the timing of the reduction or to adjust the amount of supply of hydraulic fluid to the optimal amount based on the best mix of the same and it is possible to contribute to energy saving in driving the hydraulic pumps for supply of hydraulic fluid to the extrusion press.

Further, in control of the extrusion press, the general practice is to make the main cross head (main ram) retract (move in direction away from end platen 1) at substantially the same time as the shearing blade operation. In an extrusion press employing the shearing device according to the present invention, as explained above, it is possible to greatly reduce the necessary amount of hydraulic fluid to be supplied to the shearing device, so it is possible to make most of the hydraulic fluid which had been supplied to the shearing device in the past to be supplied to the related hydraulic equipment for a retraction operation of the main crosshead (main ram). As a result, not only is a smaller amount of overall supply of hydraulic fluid by the hydraulic pumps for supplying hydraulic fluid to the extrusion press enough, but also it is possible to make the speed of retraction of the main crosshead (main ram) and other extrusion related members increase. In addition to contributing to energy saving, the idle time after the extrusion process ends and until the next extrusion process starts is shortened.

At the time of electrically powered driving of the shearing blade before and after the shearing blade operation where a smaller drive force than at the time of the shearing operation is enough, an electric motor is provided as the source of drive power of the first drive device for high speed output (for high speed descent and high speed ascent) while hydraulic cylinders are provided as sources of drive power of the second drive device for low speed, high output use (for cutting off discard/shearing blade operation). At the time of high speed descent and high speed ascent of the shearing blade, the head side chambers and rod side chambers in the hydraulic cylinders of the second drive device are freely communicated by the switching valve to make the hydraulic fluid move between the two hydraulic chambers, so the second drive device does not become resistance at the time of up and down movement of the shearing blade and high speed operation becomes possible by just the first drive device, so the idling time can be shortened.

On the other hand, in the operation for cutting off the discard performed at the hydraulic cylinder of the second driving means (shearing blade operation), it is sufficient to make the shearing blade descend from the cutting position to a cutting end position by substantially the same distance at the billet diameter inserted inside the container smaller than the ascending/descending stroke of the shearing blade. The speed of descent of the shearing blade at the time of shearing blade operation may be slowed, relative to the speed at the time of electrically powered driving the shearing blade. Further, it is sufficient to be able to obtain the cutting force required by the multiple (in the present embodiment, two) hydraulic cylinders, so it is possible to reduce the amount and pressure of the hydraulic fluid to be supplied to the hydraulic cylinders of the second driving means. On this point as well, the shearing device of an extrusion press according to the present invention can contribute to energy saving in driving the hydraulic pumps for supplying hydraulic fluid to the extrusion press.

As explained earlier, it is possible to reduce the amount and pressure of the hydraulic fluid supplied to the shearing device, so a mode is also possible making hydraulic fluid be supplied to the shearing device from a small capacity hydraulic pump unit provided with a dedicated oil tank separate from the hydraulic pumps (group) for supplying hydraulic fluid to the extrusion press. In this case, this contributes to improvement of safety as well by making the hydraulic pump unit a nonflammable water-glycol-based hydraulic fluid specification.

REFERENCE SIGNS LIST 1 end platen
10 shearing device
13 discard
21 servo motor
22 drive pulley
23 belt
24 driven pulley
25 fastening frame
27 guide
28 nut
29 shearing slide driving frame
31 ball screw
32 hydraulic cylinder
33 rod
35 shearing guide
41 shearing slide
42 shearing blade
51 switching valve
52 switching valve
53 oil tank
61 hydraulic cylinder
62 rod
63 connecting rod
64 shearing frame
65 shearing guide
66 shearing slide

The invention claimed is:

1. A shearing device of an extrusion press comprising:
a converting means for converting rotational motion of a ball screw by a servo motor to linear motion of a shearing slide driving frame,
a shearing slide attached to a front end of the shearing slide driving frame and having a shearing blade attached to its bottom end, and
a hydraulic cylinder arranged parallel to the ball screw and attached to the shearing slide driving frame and which causes the ball screw to turn to cause the shearing slide to move up and down to cut off a discard by the hydraulic cylinder,
wherein
when the shearing blade of the shearing slide moves downward from directly above a cutting position of the discard to a cutting end position for cutting the discard, a drive force which the hydraulic cylinder generates acts on the shearing slide driving frame, and when the shearing blade of the shearing slide moves downward from a standby position to directly above the cutting position and when it moves upward from the cutting end position to the standby position, only the servo motor is driven and a head side chamber and rod side chamber of the hydraulic cylinder are fluidly communicated to cause hydraulic fluid of the hydraulic cylinder to move between the head side chamber and the rod side chamber.

2. The shearing device according to claim 1, wherein a motor of a hydraulic pump supplying hydraulic fluid to the hydraulic cylinder is an inverter motor or servo motor, and the motor of the hydraulic pump stops operating when the hydraulic fluid moves between the head side chamber and the rod side chamber of the hydraulic cylinder.

3. The shearing device according to claim 2, wherein when the hydraulic fluid moves from the head side chamber to the rod side chamber, a part of the hydraulic fluid from the head side chamber is discharged to an oil tank, and when the hydraulic fluid moves from the rod side chamber to the head side chamber, a part of the hydraulic fluid is sucked out from the oil tank.

4. The shearing device according to claim 1, wherein when the hydraulic fluid moves from the head side chamber to the rod side chamber, a part of the hydraulic fluid from the head side chamber is discharged to an oil tank, and when the hydraulic fluid moves from the rod side chamber to the head side chamber, a part of the hydraulic fluid is sucked out from the oil tank.

* * * * *